(12) United States Patent
Slutz et al.

(10) Patent No.: US 7,401,171 B2
(45) Date of Patent: Jul. 15, 2008

(54) METHODS AND STRUCTURE FOR SAS EXPANDER INITIATING COMMUNICATION TO A SAS INITIATOR TO IDENTIFY CHANGES IN THE SAS DOMAIN

(75) Inventors: Mark Slutz, Colorado Springs, CO (US); David T. Uddenberg, Colorado Springs, CO (US); Brian J. Varney, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 270 days.

(21) Appl. No.: 11/262,679

(22) Filed: Oct. 31, 2005

(65) Prior Publication Data
US 2007/0100847 A1 May 3, 2007

(51) Int. Cl.
*G06F 13/00* (2006.01)
(52) U.S. Cl. .............................. 710/104; 710/8; 710/10; 710/16; 710/302
(58) Field of Classification Search ................ 710/8, 710/10, 16, 74, 104, 300, 301, 302, 305, 710/313, 315; 709/220.223, 230, 253; 370/466, 370/467; 707/4; 716/3; 717/168
See application file for complete search history.

(56) References Cited

U.S. PATENT DOCUMENTS

| | | | | |
|---|---|---|---|---|
| 7,124,234 B2 * | 10/2006 | Marushak et al. | ............ | 710/316 |
| 7,210,065 B2 * | 4/2007 | Uddenberg et al. | ........... | 714/33 |
| 2005/0080881 A1 * | 4/2005 | Voorhees et al. | ............ | 709/220 |
| 2005/0138261 A1 * | 6/2005 | Marushak et al. | ........... | 710/316 |
| 2005/0204197 A1 * | 9/2005 | Uddenberg et al. | ........... | 714/33 |
| 2006/0230218 A1 * | 10/2006 | Warren et al. | ................ | 710/315 |
| 2006/0242312 A1 * | 10/2006 | Crespi et al. | ................ | 709/230 |
| 2006/0271722 A1 * | 11/2006 | Marushak et al. | ........... | 710/316 |
| 2007/0005862 A1 * | 1/2007 | Seto | ........................... | 710/300 |
| 2007/0100847 A1 * | 5/2007 | Slutz et al. | .................. | 707/100 |

OTHER PUBLICATIONS

"A comprehensive production test solution for 1.5Gb/s and 3Gb/s serial—ATA—based on AWG and undersampling techniques" by Cai et al. (abstract only) Publication Date; Nov. 8-10, 2005.*

* cited by examiner

*Primary Examiner*—Glenn A Auve
(74) *Attorney, Agent, or Firm*—Duft, Bornsen & Fishman

(57) ABSTRACT

Methods and structures within a SAS expander for initiating communication with one or more SAS initiators in a SAS domain to inform the initiators of sensed changes in the domain without the need for a full SAS Discovery process. In one aspect hereof, the expander may transmit a vendor unique BROADCAST primitive to inform SAS initiators that they should initiate a vendor unique SMP or SSP exchange with the expander to determine changes to the SAS domain. In another aspect hereof, the SAS initiator may respond as an SMP or SSP target device in response to initiation of vendor unique SMP or SSP exchanges by the expander. The expander may report to initiators regarding sensed changes in the domain and/or statistics regarding operation of the expander or other elements of the domain.

21 Claims, 4 Drawing Sheets

METHODS AND STRUCTURE FOR SAS EXPANDER INITIATING COMMUNICATION TO A SAS INITIATOR TO IDENTIFY CHANGES IN THE SAS DOMAIN

BACKGROUND OF THE INVENTION

1. Field of the Invention

The invention relates generally to serial attached SCSI ("SAS") domains and more specifically to methods and structures enabling a SAS expander to initiate communication with a SAS initiator to identify sensed changes in the SAS domain.

2. Discussion of Related Art

Small Computer Systems Interface ("SCSI") is a set of American National Standards Institute ("ANSI") standard electronic interface specification that allows, for example, computers to communicate with peripheral hardware. Common SCSI compatible peripheral devices may include: disk drives, tape drives, CD drives ("CD-ROM", "CD-RW", etc), DVD drives, printers and scanners. SCSI as originally created included both a command/response data structure specification and an interface and protocol standard for a parallel bus structure for attachment of devices. SCSI has evolved from exclusively parallel interfaces to include both parallel and serial interfaces. "SCSI" is now generally understood as referring either to the communication transport media (parallel bus structures and various serial transports) or to a plurality of primary commands common to most devices and command sets to meet the needs of specific device types as well as a variety of interface standards and protocols.

The collection of primary commands and other command sets may be used with SCSI parallel interfaces as well as with serial interfaces. The serial interface transport media standards that support SCSI command processing include: Fibre Channel, Serial Bus Protocol (used with the Institute of Electrical and Electronics Engineers 1394 FireWire physical protocol; "IEEE 1394") and the Serial Storage Protocol (SSP).

SCSI interface transports and commands are also used to interconnect networks of storage devices with processing devices. For example, serial SCSI transport media and protocols such as Serial Attached SCSI ("SAS") and Serial Advanced Technology Attachment ("SATA") may be used in such networks. These applications are often referred to as storage networks. Those skilled in the art are familiar with SAS and SATA standards as well as other SCSI related specifications and standards. Information about such interfaces and commands is generally obtainable at the website http://www.t10.org. As used herein, reference to SAS devices and protocols may be understood to include SATA devices and protocols. The problems discussed herein and the solutions provided by this invention are similarly applicable to SATA devices.

Such SCSI storage networks are often used in large storage systems having a plurality of disk drives to store data for organizations and/or businesses. The network architecture allows storage devices to be physically dispersed in an enterprise while continuing to directly support SCSI commands. This architecture allows for distribution of the storage components in an enterprise without the need for added overhead in converting storage requests from SCSI commands into other network commands and then back into lower level SCSI storage related commands.

A SAS network typically comprises one or more SAS initiators coupled to one or more SAS targets often via one or more SAS expanders. In general, as is common in all SCSI communications, SAS initiators initiate communications with SAS targets. The expanders expand the number of ports of a SAS network domain used to interconnect SAS initiators and SAS targets (collectively referred to as SAS devices or SAS device controllers).

In general, a SAS initiator directs information to a SAS target device through ports of one or more SAS expanders in the SAS domain. A "port" in SAS terminology is a logical concept. A port may comprise one or more physical links in a SAS domain. Such physical links are often referred to as PHYs in the terminology of SAS domains. A port may use a single PHY or, if the port is configured as a wide port, may use multiple PHYs logically grouped to provide higher bandwidth.

When a SAS domain starts up, one or more initiator devices perform a "Discovery" process in accordance with the SAS specifications so that each SAS component may generate information indicative of the SAS domain topology. In other words, the SAS Discovery process specified by the SAS specifications permits each SAS device and each SAS expander in the domain to discover information about immediate neighbors coupled to its ports as well as information about other devices and expanders coupled to ports of neighboring components. Thus, each SAS device and SAS expander in a SAS domain may acquire information regarding the overall geometry or topology of the SAS domain.

When a change occurs in the SAS domain, a SAS expander as presently known in the art has only a limited role in adapting devices in the SAS domain to reconfigure for the sensed change. In particular, if a SAS expander senses a change in the SAS domain, as presently known in the art, the SAS expander may issue a BROADCAST(CHANGE) primitive to broadcast to all SAS initiators the fact that some change has occurred. The SAS expander does not inform the SAS initiators what change has been detected. Rather, a SAS initiator that receives the BROADCAST primitive on he SAS communication medium will perform the SAS Discovery process anew. The SAS Discovery process re-discovers all configuration and topological information regarding devices in the SAS domain—whether changed or not changed. Performing a complete SAS Discovery process to detect any change in a SAS domain, even a small change, consumes valuable resources in the SAS initiator and valuable bandwidth in the SAS domain communication paths.

It is therefore evident from the above discussion that a need exists for improved solutions in a SAS domain to easily identify changes in a SAS domain while reducing overhead processing and communication in the SAS domain.

SUMMARY OF THE INVENTION

The present invention solves the above and other problems, thereby advancing the state of the useful arts, by providing methods and structures associated with a SAS expander in a SAS domain for initiating communication with one or more SAS initiators for purposes of identifying sensed changes in the SAS domain without the need for complex, time consuming, bandwidth consuming SAS Discovery processing by the SAS initiator. In one aspect hereof, the SAS expander enhanced in accordance with features and aspects hereof may utilize a SAS BROADCAST primitive to elicit a query command from the SAS initiator. A reply to the query by the expander may then supply the initiator with information identifying the sensed changed in the SAS domain. In another aspect hereof, the expander may operate in the role of an initiator under the SMP or SSP protocols and the initiator may act in the role of an SMP or SSP target to receive information identifying the sensed change in the SAS domain.

A first feature hereof therefore provides a method for communicating regarding a change in a SAS domain, the method comprising: detecting, within a SAS expander of the SAS domain, a change in the SAS domain; and initiating, within the SAS expander, a vendor unique communication exchange between the SAS expander and a SAS initiator wherein the exchange identifies the sensed change in the SAS domain.

Another aspect hereof further provides for adapting operation of the SAS initiator in response to the communication exchange.

Another aspect hereof further provides that the step of initiating further comprises: transmitting a BROADCAST primitive with vendor unique information indicating that a change occurred, and provides that method further comprises: querying the SAS expander, by operation of the SAS initiator, using a vendor unique command to obtain information identifying the sensed change; and replying to the SAS initiator's query, by operation of the SAS expander, to provide the information identifying the sensed change.

Another aspect hereof further provides that the query and reply are SMP exchanges.

Another aspect hereof further provides that the query and reply are SSP exchanges.

Another aspect hereof further provides that the step of initiating further comprises: transmitting a command from the SAS expander to the SAS initiator wherein the command includes vendor unique information identifying the sensed change.

Another aspect hereof further provides that the step of transmitting further comprises: transmitting an SMP command where the SAS expander operates in the role of an SMP initiator and wherein the SAS initiator operates in the role of an SMP target.

Another aspect hereof further provides that the step of transmitting further comprises: transmitting an SSP command where the SAS expander operates in the role of an SSP initiator and wherein the SAS initiator operates in the role of an SSP target.

Another feature hereof provides an apparatus in a SAS domain, the apparatus comprising: an enhanced SAS expander adapted to sense a change in the SAS domain and adapted to transmit vendor unique information identifying the sensed change; and an enhanced SAS initiator adapted to receive vendor unique information from the enhanced SAS expander identifying the sensed change.

Another aspect hereof further provides that the enhanced SAS expander is adapted to transmit a BROADCAST primitive with vendor unique information and is adapted to return information identifying a sensed change in response to a query received from the enhanced SAS initiator, and provides that the enhanced SAS initiator is adapted to receive the BROADCAST primitive and is adapted to query the enhanced SAS expander regarding the sensed change and is adapted to configure operation of the SAS initiator based on the information returned from the enhanced SAS expander identifying the sensed change.

Another aspect hereof further provides that the enhanced SAS expander is adapted to transmit a vendor unique command to the enhanced SAS initiator wherein the vendor unique command identifies the sensed change; and provides that the enhanced SAS initiator is adapted to receive the vendor unique command and is adapted to configure operation of the SAS initiator based on the identified sensed change in the vendor unique command.

Another aspect hereof further provides that the command is an SMP command and wherein the enhanced SAS expander is configurable to operate as an SMP initiator and wherein the enhanced SAS initiator is configurable to operate as an SMP target.

Another aspect hereof further provides that the command is an SSP command and wherein the enhanced SAS expander is configurable to operate as an SSP initiator and wherein the enhanced SAS initiator is configurable to operate as an SSP target.

DETAILED DESCRIPTION OF THE DRAWINGS

Figure 1:
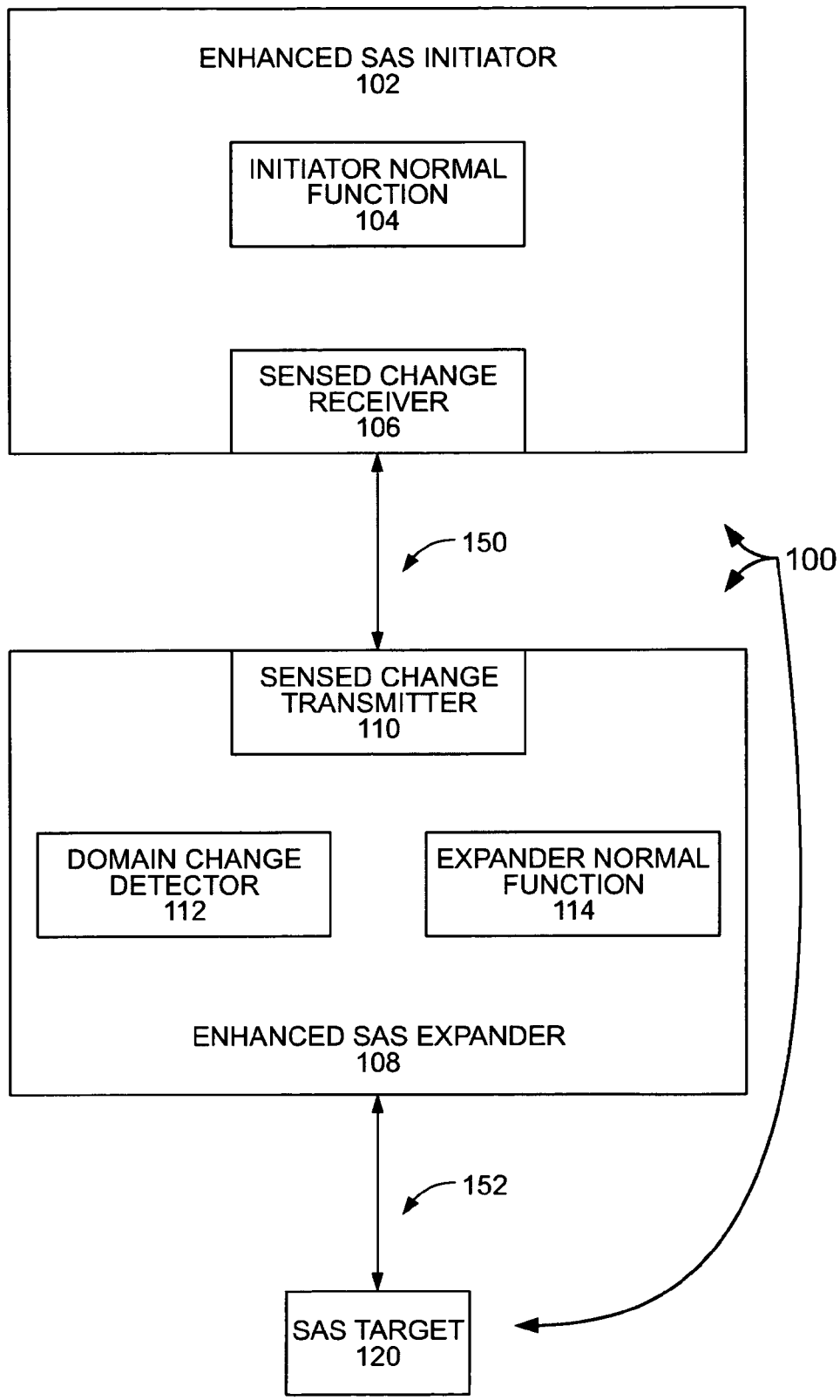
FIG. 1 is a block diagram of a SAS domain embodying features and aspects hereof for SAS expander initiation of communication with a SAS initiator to inform of detected changes in the SAS domain.

FIG. 1 is a block diagram showing a SAS domain 100 including a SAS initiator 102 and a SAS expander 108 enhanced in accordance with features and aspects hereof to enable a SAS expander to initiate communications with a SAS initiator in response to detection of a change in the SAS domain 100. SAS domain 100 may generally be utilized to permit enhanced SAS initiator 102 to establish communications with SAS target 120. Transmissions between enhanced SAS initiator 102 and SAS target 120 may be passed through ports of enhanced SAS expander 108. Enhanced SAS initiator 102 is generally coupled to enhanced SAS expander 108 through corresponding ports and communication path 150 while SAS target 120 is coupled to enhanced SAS expander 108 through other corresponding ports and communication path 152. Those of ordinary skill in the art will readily recognize that SAS domain 100 may include any number of SAS initiator devices, SAS target devices, SAS expanders, and corresponding ports and communication paths linking the various components in a preferred configuration. FIG. 1 shows a single initiator 102 and a single target 120 coupled through corresponding individual ports of a single expander 108. This simplified domain 100 is intended merely for exemplary discussion of features and aspects hereof.

Enhanced SAS initiator 102 includes functional features 104 for performing normal initiator operations. In like manner, enhanced SAS expander 108 includes functional features 114 for performing normal expander operations to forward messages on its various ports. In one aspect hereof, SAS expander 108 is enhanced through the addition of domain change detector 112 and sensed change transmitter 110. Domain change detector 112 is operable within the enhanced SAS expander 108 to detect occurrence of a change in the SAS domain 100. Sensed changes may include: addition or removal of a SAS expander and/or a SAS device, failure of a port or link in the SAS domain, reset or re-initialization of the entire SAS domain or of particular devices in the domain, etc. Those of ordinary skill in the art will readily recognize numerous other changed conditions and configuration aspects of a SAS domain that may be sensed automatically by the enhanced SAS expander 108 through domain change detector 112.

In another aspect hereof, SAS initiator 102 may be enhanced by the addition of the sensed change receiver 106 adapted to receive information regarding sensed changes via path 150 from the sensed change transmitter 110 of the enhanced SAS expander 108. Enhanced SAS expander 108 may detect changes in the SAS domain 100 and inform the enhanced SAS initiator 102 without the need for complex, time consuming, bandwidth consuming SAS Discovery processes by a SAS initiator to determine what specific change has occurred.

Sensed change transmitter 110 and sensed change receiver 106 may communicate utilizing customized or the vendor unique SAS primitives and commands. For example, and as discussed further herein below, the sensed change transmitter 110 of the enhanced SAS expander 108 may issue a vendor unique broadcast primitive over the SAS communication paths 150 to the sensed change receiver 106. In response to receipt of such a vendor unique broadcast primitive, sensed change receiver 106 may issue an appropriate vendor unique command back to the sensed change transmitter 110 in the enhanced SAS expander 108 querying for return of information identifying the sensed change. The sensed change transmitter 110 may then return the requested information to the sensed change receiver 106 in the enhanced SAS initiator 102. Or, for example, the enhanced SAS expander 108 may be configurable to operate as a SAS initiator device while the enhanced SAS initiator 102 may be configured as a SAS target device such that sensed change transmitter 110 may simply forward a vendor unique command as an initiator to the sensed change receiver 106 acting in the role of a target.

Where a vendor unique command and reply are exchanged between the sensed change transmitter 110 and the sensed change receiver 106, the SMP and/or SSP protocols of the SAS architecture may be employed for transmission of such vendor unique information. The command and/or reply may transfer information identifying the particular change in the SAS domain 100 sensed by the enhanced SAS expander 108. Those of ordinary skill in the art will readily recognize a variety of particular SAS primitives and/or command frame exchanges that may be employed for purposes of informing the SAS initiator of a change in the SAS domain detected by the enhanced SAS expander 108. Further, those of ordinary skill in the art will recognize a number of other elements may be present within a functional initiator device, target device, or an operable SAS expander.

Figure 2:
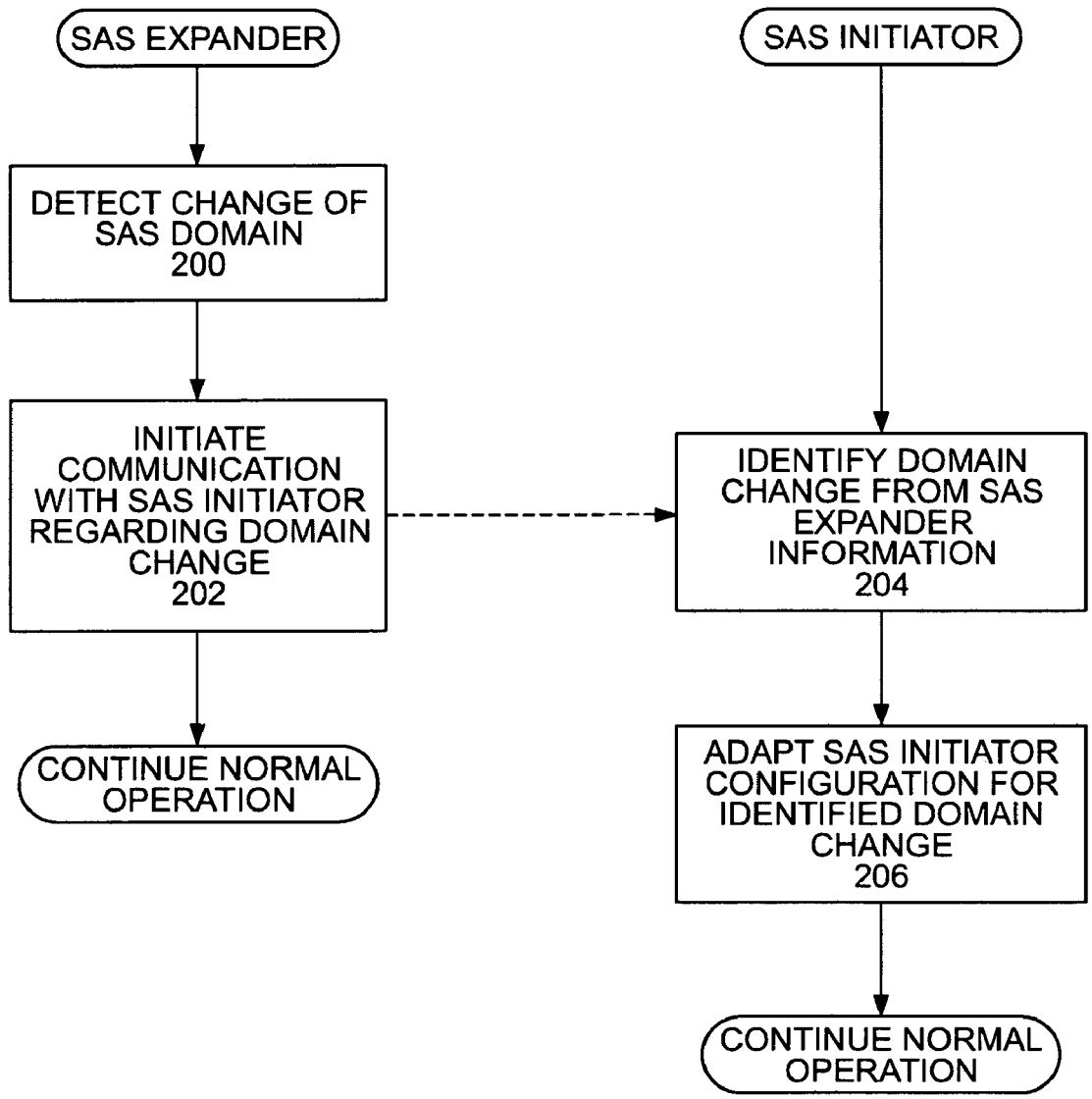
FIGS. 2 through 4 are flowcharts describing methods associated with features and aspects hereof wherein a SAS expander may identify a change in the SAS domain and inform a SAS initiator of the sensed change without need for a SAS Discovery process.

FIG. 2 is a flowchart generally describing a method in accordance with features and aspects hereof cooperatively operable within the enhanced SAS expander and an enhanced SAS initiator coupled thereto. Element 200 represents processing within the enhanced SAS expander to detect a change in the SAS domain. As noted above, a variety of changes may be sensed by operation of the enhanced SAS expander including, for example, addition or removal of a device in the SAS domain, failure or restoration of a communication path within the SAS domain, reconfiguration of one or more ports in the SAS domain, etc. Element 202 then represents processing within the enhanced SAS expander to initiate communications with the enhanced SAS initiator regarding the sensed change in the SAS domain. The dashed arrow coupling element 202 to element 204 represents initiation and completion of such communication exchange between the enhanced SAS expander and the enhanced SAS initiator. In general, the processing of element 202 initiates communications to provide information to the enhanced SAS initiator that identifies the specific change that has been sensed by operation of element 200.

The enhanced SAS initiator, in receipt of such change identity information, need not perform complex, time consuming, bandwidth consuming SAS Discovery processing to determine what particular change has occurred. Rather, element 204 represents processing within the enhanced SAS initiator responsive to the communication from the enhanced SAS expander to identify the particular domain change provided in the information received from the enhanced SAS expander. Element 206 then appropriately adapts configuration or operation of the enhanced SAS initiator as required for the identified domain change sensed by operation of the enhanced SAS expander. The required adaptation may involve updating of configuration or routing tables, enabling or disabling particular ports of the expander, etc. Both the SAS expander and SAS initiator may then resume normal operation processing and forwarding information exchanges between initiator devices and target devices of the SAS domain.

Figure 3:
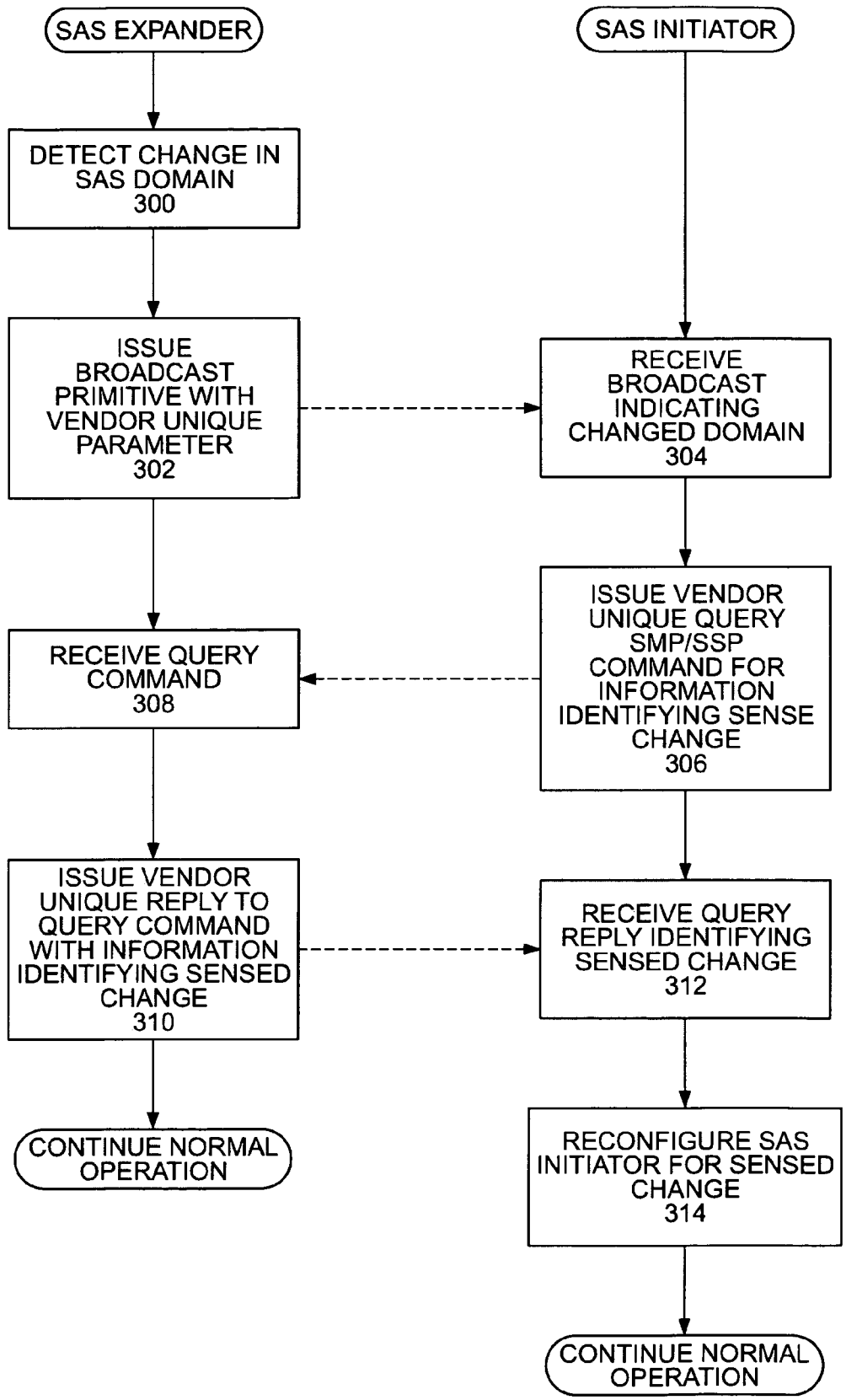

FIG. 3 is a flowchart providing additional details of an exemplary embodiment of features and aspects hereof to permit a SAS expander to notify a SAS initiator of a detected change in the SAS domain. As above with respect to FIG. 2, the flowchart of FIG. 3 represents cooperative processing operable within both the SAS expander and the SAS initiator enhanced in accordance with features and aspects hereof. The dashed line arrows between various elements of the flowchart represent information exchanged between the SAS expander and SAS initiator to permit the cooperative processing to continue and complete the process of sensing a change and informing the initiator of the sensed change.

Element 300 is first operable within a SAS expander enhanced in accordance with features and aspects hereof to detect a change in the SAS domain. As noted above, any of several common changes in a SAS domain may be detected by the enhanced SAS expander including, for example, addition or removal of a SAS device, failure or restoration of a sense communication path or port, etc. Having so detected some change in the SAS domain, element 302 is then operable to issue a SAS BROADCAST primitive with a parameter indicating that a change has been sensed in the SAS domain. The BROADCAST primitive is a standard SAS primitive known to those of ordinary skill as applied to SAS communication domains. The parameter associated with the BROADCAST primitive may be utilized to indicate to the receiving SAS initiator that the BROADCAST is intended to indicate that some change has occurred. Those of ordinary skill in the art of will readily recognize that a standard BROADCAST(CHANGE) parameter may be used to signal such a detected change as well as other parameters including vendor unique parameters so long as the enhanced SAS initiator processes the notification primitive in accordance with features and aspects hereof.

The cooperative processing element 304 operable within the enhanced SAS initiator may receive the BROADCAST primitive indicating detection of a change in the SAS domain. Enhanced SAS initiator then continues processing with element 306 to issue a vendor unique query command returned to the enhanced SAS expander. The query command requests specific information from the enhanced SAS expander to identify the particular change sensed in the SAS domain by the SAS expander. The SMP or SSP protocols associated with SAS domains may be utilized for transmitting such a vendor unique query command from the SAS initiator to the SAS expander. Cooperative processing within the enhanced SAS expander may then continue with element 308 operable to receive the transmitted query command from the SAS initiator. Element 310 is then operable within the SAS expander to issue an appropriate vendor unique reply to the received query command supplying the requested information identifying the sensed change in the SAS domain. The enhanced SAS expander may then continue normal operation processing other exchanges with the SAS domain. Cooperative processing within the enhanced the SAS initiator may then continue with element 312 to receive the vendor unique reply to the query command supplying the requested information identifying the sensed change in the SAS domain.

Element 314 may then reconfigure the SAS initiator as required based on the sensed change information provided by the enhanced SAS expander. The SAS initiator may then continue normal operation processing other exchanges in the SAS domain.

The BROADCAST, query command, and query reply sequence described by the method of FIG. 3 permits the enhanced SAS initiator to rapidly identify a particular change in the SAS domain without the need for complex, time consuming, bandwidth consuming SAS Discovery processes as presently practiced in the art. Those of ordinary skill in the art will readily recognize a wide variety of equivalent method steps for performing such an exchange to rapidly identify a sensed change in a SAS domain. In particular, the parameters associated with the BROADCAST primitive, use of other primitives, the structure and parameters associated with the query command and its associated reply may be implemented utilizing a wide variety of values and data sequences as a matter of design choice. FIG. 3 is therefore intended merely as representative of one exemplary embodiment of features and aspects hereof to permit an enhanced SAS expander to rapidly inform an enhanced SAS initiator of a sensed change in the SAS domain.

Figure 4:
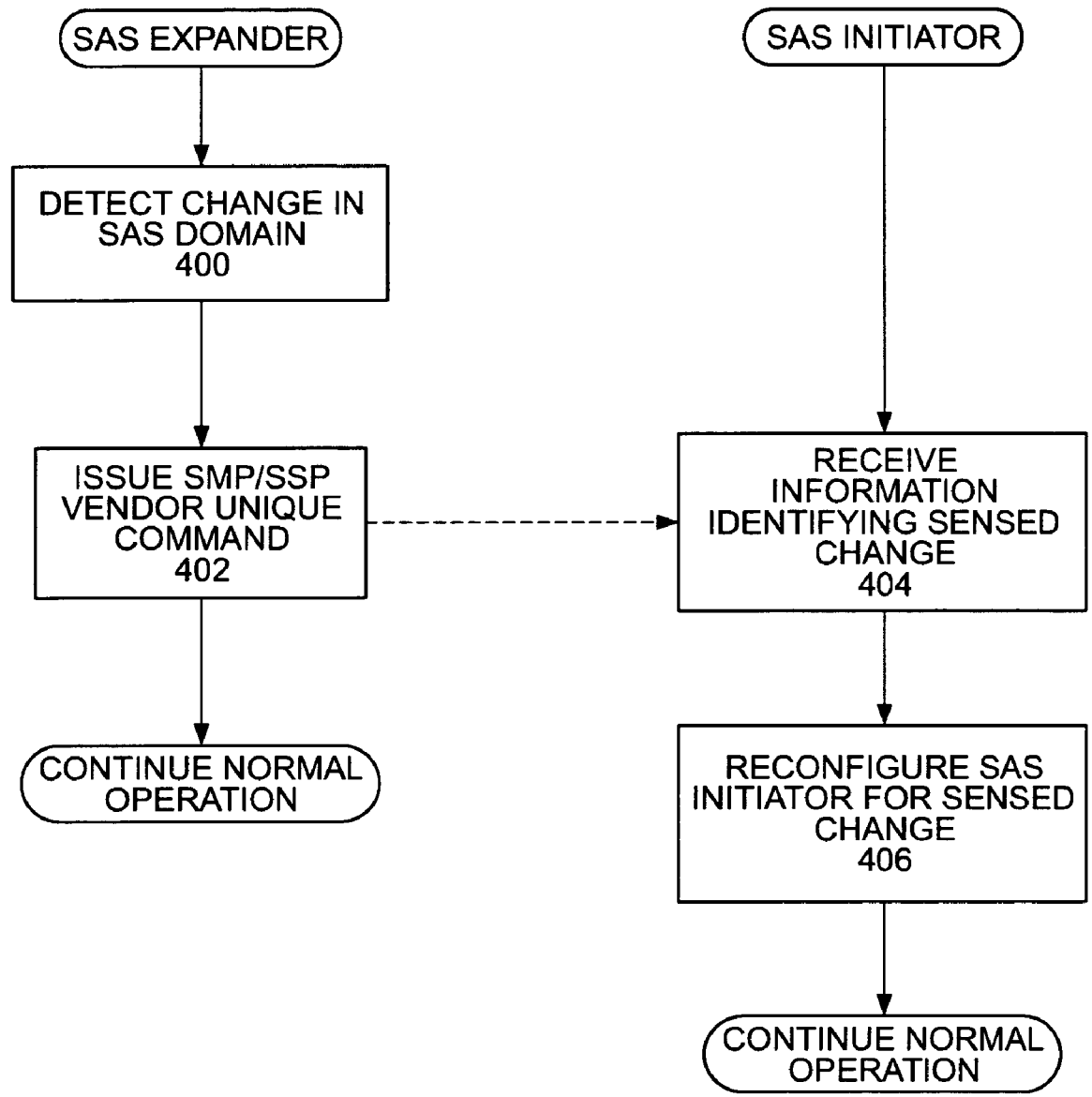

FIG. 4 is a flowchart describing another exemplary embodiment of a method in accordance with features and aspects hereof to permit an enhanced SAS expander to rapidly notify an enhanced SAS initiator of a sensed change in a SAS domain. As above with FIGS. 2 and 3, the method of FIG. 4 may be implemented by cooperative processing within an enhanced SAS expander coupled to an enhanced SAS initiator. The dashed line arrow between elements of the flowchart represent information exchanged between the enhanced SAS expander and the enhanced SAS initiator for purposes of identifying a sensed change in the SAS domain.

Element 400 is first operable within the enhanced SAS expander to detect a change in the SAS domain. As above, any of several changes in the SAS domain may be detected by operation of the SAS expander. Element 402 is next operable within the enhanced SAS expander to issue an appropriate SMP or SSP protocol command supplying information identifying the sensed change. As above, the SMP or SSP protocols of the SAS standards may be utilized for such a command transmission including vendor unique parameters and information for identifying a particular sensed change in the SAS domain. The enhanced SAS expander may then continue normal operation processing other exchanges in the SAS domain.

Element 404, operable within the enhanced SAS initiator, may then receive information identifying the sensed change supplied by the SAS expander in its issued SMP or SSP command transmission. Element 406 is operable to appropriately reconfigure the enhanced SAS initiator in accordance with the needs of the particular sensed change in the SAS domain. The SAS initiator may then continue normal operation processing other exchanges and SAS domain.

As above with respect to FIGS. 2 and 3, FIG. 4 is intended merely as exemplary of one possible embodiment of features and aspects hereof wherein an enhanced SAS expander may rapidly identify a change in the SAS domain and inform a SAS initiator of the sensed change without the need for complex, time consuming, bandwidth consuming SAS Discovery processing by the SAS initiator. A wide variety of other command structures and associated parameters may be employed as a matter of design choice in accordance with features and aspects hereof.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. In particular, those of ordinary skill in the art will readily recognize that features and aspects hereof may be implemented equivalently in electronic circuits or as suitably programmed instructions of a general or special purpose processor. Such equivalency of circuit and programming designs is well known to those skilled in the art as a matter of design choice. As a result, the invention is not limited to the specific examples and illustrations discussed above, but only by the following claims and their equivalents.

What is claimed is:

1. A method for communicating regarding a change in a serial attached SCSI (SAS) domain, the method comprising:
    sensing, within a SAS expander of the SAS domain, a change in the SAS domain; and
    initiating, within the SAS expander, a vendor unique communication exchange between the SAS expander and a SAS initiator wherein the exchange identifies the sensed change in the SAS domain,
    wherein for purposes of the initiated exchange, the SAS expander operates in the role of a SAS initiator and the SAS initiator operates in the role of a SAS target.

2. The method of claim 1 further comprising:
    adapting operation of the SAS initiator in response to the communication exchange.

3. The method of claim 1
    wherein the step of initiating further comprises:
    transmitting a BROADCAST primitive with vendor unique information indicating that a change occurred, and
    wherein the method further comprises:
    querying the SAS expander, by operation of the SAS initiator, using a vendor unique command to obtain information identifying the sensed change; and
    replying to the SAS initiator's query, by operation of the SAS expander, to provide the information identifying the sensed change.

4. The method of claim 3 wherein the query and reply are SMP exchanges.

5. The method of claim 3 wherein the query and reply are SSP exchanges.

6. The method of claim 1 wherein the step of initiating further comprises:
    transmitting a command from the SAS expander to the SAS initiator wherein the command includes vendor unique information identifying the sensed change.

7. The method of claim 6 wherein the step of transmitting further comprises:
    transmitting an SMP command where the SAS expander operates in the role of an SMP initiator and wherein the SAS initiator operates in the role of an SMP target.

8. The method of claim 6 wherein the step of transmitting further comprises:
    transmitting an SSP command where the SAS expander operates in the role of an SSP initiator and wherein the SAS initiator operates in the role of an SSP target.

9. In a serial attached SCSI (SAS) domain, apparatus comprising:
an enhanced SAS expander adapted to sense a change in the SAS domain and adapted to transmit vendor unique information identifying the sensed change wherein the enhanced SAS expander operates in the role of a SAS initiator to initiate the transmission; and
an enhanced SAS initiator adapted to receive vendor unique information from the enhanced SAS expander identifying the sensed change wherein the enhanced SAS initiator operates in the role of a SAS target to receive the transmitted information from the enhanced SAS expander.

10. The apparatus of claim 9
wherein the enhanced SAS expander is adapted to transmit a BROADCAST primitive with vendor unique information and is adapted to return information identifying a sensed change in response to a query received from the enhanced SAS initiator, and
wherein the enhanced SAS initiator is adapted to receive the BROADCAST primitive and is adapted to query the enhanced SAS expander regarding the sensed change and is adapted to configure operation of the SAS initiator based on the information returned from the enhanced SAS expander identifying the sensed change.

11. The apparatus of claim 9
wherein the enhanced SAS expander is adapted to transmit a vendor unique command to the enhanced SAS initiator wherein the vendor unique command identifies the sensed change; and
wherein the enhanced SAS initiator is adapted to receive the vendor unique command and is adapted to configure operation of the SAS initiator based on the identified sensed change in the vendor unique command.

12. The apparatus of claim 11 wherein the command is an SMP command and wherein the enhanced SAS expander is configurable to operate as an SMP initiator and wherein the enhanced SAS initiator is configurable to operate as an SMP target.

13. The apparatus of claim 11 wherein the command is an SSP command and wherein the enhanced SAS expander is configurable to operate as an SSP initiator and wherein the enhanced SAS initiator is configurable to operate as an SSP target.

14. A system for communicating regarding a change in a serial attached SCSI (SAS) domain, the system comprising:
sensing means, within a SAS expander of the SAS domain, for sensing a change in the SAS domain; and
initiating means, within the SAS expander, for initiating a vendor unique communication exchange between the SAS expander and a SAS initiator coupled to the SAS expander wherein the exchange identifies the sensed change in the SAS domain,
wherein for purposes of the initiated exchange, the SAS expander operates in the role of a SAS initiator and the SAS initiator operates in the role of a SAS target.

15. The system of claim 14 further comprising:
means for adapting operation of the SAS initiator in response to the communication exchange.

16. The system of claim 14
wherein the initiating means further comprises:
means for transmitting a BROADCAST primitive with vendor unique information indicating that a change occurred, and
wherein the system further comprises:
means, within the SAS initiator, for querying the SAS expander using a vendor unique command to obtain information identifying the sensed change; and
means, within the SAS expander, for replying to the SAS initiator's query to provide the information identifying the sensed change.

17. The system of claim 16 wherein the query and reply are SMP exchanges.

18. The system of claim 16 wherein the query and reply are SSP exchanges.

19. The system of claim 14 wherein the initiating means further comprises:
means, within the SAS expander, for transmitting a command from the SAS expander to the SAS initiator wherein the command includes vendor unique information identifying the sensed change.

20. The system of claim 19 wherein the means for transmitting further comprises:
means for transmitting an SMP command where the SAS expander operates in the role of an SMP initiator and wherein the SAS initiator operates in the role of an SMP target.

21. The system of claim 19 wherein the means for transmitting further comprises:
means for transmitting an SSP command where the SAS expander operates in the role of an SSP initiator and wherein the SAS initiator operates in the role of an SSP target.

* * * * *